(12) United States Patent
Schuett et al.

(10) Patent No.: US 7,347,481 B2
(45) Date of Patent: Mar. 25, 2008

(54) VEHICLE ROOF OF A CONVERTIBLE WITH A MOVABLE REAR WINDOW

(75) Inventors: Thomas Schuett, Fuerstenfeldbruck (DE); Fritz Wegener, Gilching (DE)

(73) Assignee: Open Air Systems GmbH, Stockdorf (DE)

( * ) Notice: Subject to any disclaimer, the term of this patent is extended or adjusted under 35 U.S.C. 154(b) by 131 days.

(21) Appl. No.: 11/098,598

(22) Filed: Apr. 5, 2005

(65) Prior Publication Data
US 2005/0218690 A1 Oct. 6, 2005

(30) Foreign Application Priority Data
Apr. 5, 2004 (DE) ...................... 10 2004 017 240

(51) Int. Cl.
*B60J 7/14* (2006.01)
(52) U.S. Cl. .......................... 296/107.07; 296/107.17; 296/124; 296/146.14
(58) Field of Classification Search .......... 296/107.07, 296/108, 124, 146.14, 201
See application file for complete search history.

(56) References Cited
U.S. PATENT DOCUMENTS

| 2,957,725 | A | * | 10/1960 | Ford et al. ................ 296/107.2 |
| 4,693,509 | A | * | 9/1987 | Moy et al. ................. 296/201 |
| 6,123,382 | A | * | 9/2000 | Lorenz .................. 296/146.14 |
| 6,131,988 | A | * | 10/2000 | Queveau et al. ........ 296/107.17 |
| 6,382,703 | B1 | * | 5/2002 | Queveau et al. ........ 296/107.17 |
| 6,425,620 | B1 | * | 7/2002 | Schutt et al. ........... 296/107.07 |
| 6,629,718 | B2 | * | 10/2003 | Bauer et al. ................. 296/108 |
| 6,672,658 | B2 | * | 1/2004 | De Gaillard ........... 296/220.01 |
| 6,857,685 | B2 | * | 2/2005 | Wagner ................. 296/107.07 |
| 6,866,324 | B2 | * | 3/2005 | Neubrand et al. .......... 296/108 |
| 6,871,901 | B2 | * | 3/2005 | Stenvers et al. ............ 296/108 |
| 7,014,246 | B2 | * | 3/2006 | Huedepohl ............. 296/107.07 |
| 7,134,708 | B2 | * | 11/2006 | Russke ....................... 296/108 |

FOREIGN PATENT DOCUMENTS

DE         199 36 252 A1     2/2001

\* cited by examiner

*Primary Examiner*—Dennis H. Pedder
*Assistant Examiner*—Mike Hernandez
(74) *Attorney, Agent, or Firm*—David S. Safran (57) ABSTRACT

A vehicle roof of a convertible with at least one front roof part, a rear roof part that is movable between a closed position over the vehicle interior and an open position in which it is stowed in a rear stowage space, and a rear window which is pivotably supported on the rear roof part. In the open position in the stowage space, the window is raised relative to the rear roof part. For improved actuation of the rear window, a holding mechanism keeps the rear window in its closed position on the rear roof part and when the rear roof part is being stowed, releases the rear window to swing relative to the rear roof part. A support is located in the stowage space and supports the rear window while the rear roof part is lowered into its stowage position.

12 Claims, 9 Drawing Sheets

FIG. 7

VEHICLE ROOF OF A CONVERTIBLE WITH A MOVABLE REAR WINDOW

BACKGROUND OF THE INVENTION

1. Field of Invention

The invention relates to the vehicle roof of a convertible with at least one front roof part and one rear roof part, of which at least the rear roof part can be moved between a closed position over the vehicle interior and an open position in which the rear roof part is stowed in a rear stowage space, and with a rear window which is supported on the rear roof part, which can be swung relative to the rear roof part, and which, in the open position in the stowage space, assumes a position which is raised relative to the rear roof part.

2. Description of Related Art

German Patent DE 199 36 252 C2 discloses a generic motor vehicle roof in which the rear window is continuously moved relative to the rear roof part when the roof is lowered by means of kinematic sustained forcing. The kinematic sustained forcing is produced via a movement mechanism which has, for example, a four-bar mechanism and a control lever which is connected to it, and which acts on a lateral middle section of the rear window. Via this control lever, the rear window, in the closed position, is pressed against a seal on the rear roof part and is held in the open position relative to the rear roof part.

In the motor vehicle roof known from German Patent Application DE 199 32 503 A1 and corresponding to U.S. Pat. No. 6,425,620, the rear window, which is pivotally mounted on the rear roof part, can be swung by means of its own drive relative to the rear roof part. The drive is located laterally in the middle section of the rear roof part and must apply a comparatively high closing force in order to press the rear window against the seal between the rear window and the rear roof part.

SUMMARY OF THE INVENTION

A primary object of the present invention is to devise a motor vehicle roof of the initially indicated type in which the rear window, with the roof closed and also stowed, is located in the position which is intended at the time while omitting continuous kinematic sustained forcing.

The object is achieved in the aforementioned motor vehicle roof in accordance with the invention by a holding means which, with the roof closed, keeps the rear window in its closed position on the rear roof part, and when the rear roof part is being stowed, releases the rear window to pivot relative to the rear roof part, and is supported by a support which is located on the stowage space when the rear roof part is being stowed in its stowage position, while the rear roof part continues to be lowered as it swings in relative terms opposite the rear window. The holding means thus keeps the rear window in its closed position tightly against the rear roof part and the parts laterally bordering the rear window, such as the side C pillars, and moreover, also when the roof is being stowed, at least as long as the rear window itself, as a result of its weight could independently swing opposite to the rear roof part. If the holding means releases the rear window for pivoting, it can still be loosely connected to the rear window and can move passively at the same time, or it is separated completely from the rear window. It is thus preferred that the rear window is not coupled by means of the holding device or a sustained forcing means for swinging during the entire sequence of motion as the roof is being stowed. It is important that the support in the stowage space defines the position of the rear window in the stowage space.

The roof is especially the hardtop roof of a motor vehicle, but can also be formed as a softtop or can have softtop elements.

Even if fundamentally different configurations for the arrangement of the pivoting support of the rear window and its arrangement on the rear roof part are possible, it is feasible if the rear window in its closed position adjoins the bottom of a flange of the rear roof part or the side C pillars of the rear roof part, and if the rear roof part is swung during stowage, so that the outer side of the rear window faces downward in the stowage space. Thus, with a comparatively simple bearing means for the roof parts in conjunction with the swinging rear window, space-saving stowage of the roof in the stowage space or trunk of the vehicle is achieved.

Preferably, the holding means has at least one locking hook which is pivotally mounted on the rear roof part, and which interacts with a latch opposing part or locking pin which is connected to the rear window. The locking hook offers secure and fixed locking of the rear window and can also press or pull the rear window into an edge-side seal. However, basically, also other types of holding means can be used, for example, elastic holding elements or movable and especially spring-loaded pins. Feasibly, the holding means is located near the top edge of the rear window and thus away from its pivot axis in order to be able to produce a high holding force with a low actuation force.

In one simple configuration, the holding means is coupled to the bearing means of the roof and is controlled by its swinging motion. Thus, an independent drive for actuating the holding means is not necessary.

The coupling or actuation of the holding means takes place, preferably, by the locking hook being coupled by means of a control connecting rod to a four-bar mechanism which supports the roof and especially to a bracket which connects a front and a rear connecting rod of the four-bar mechanism and being actuated by the bracket.

In another configuration, the locking hook is connected by means of the control rod to a vehicle-mounted part, especially to the main bearing of the roof support.

If, as a result of the configuration of the bearing mechanism, the rear window executes relative motion opposite the support as the roof is being stowed, it is advantageous if at least one support contains a roller which rests on the rear window. The roller enables a simple compensation movement so that the rear window need not slide on a stationary support.

Preferably, a respective support supports the rear window on each of its opposing side edges, especially near its top edge. Thus, the area under the rear window remains unobstructed for loading.

The motor vehicle roof is explained in detail below with reference to the accompanying drawings.

DETAILED DESCRIPTION OF THE INVENTION

Figure 8:
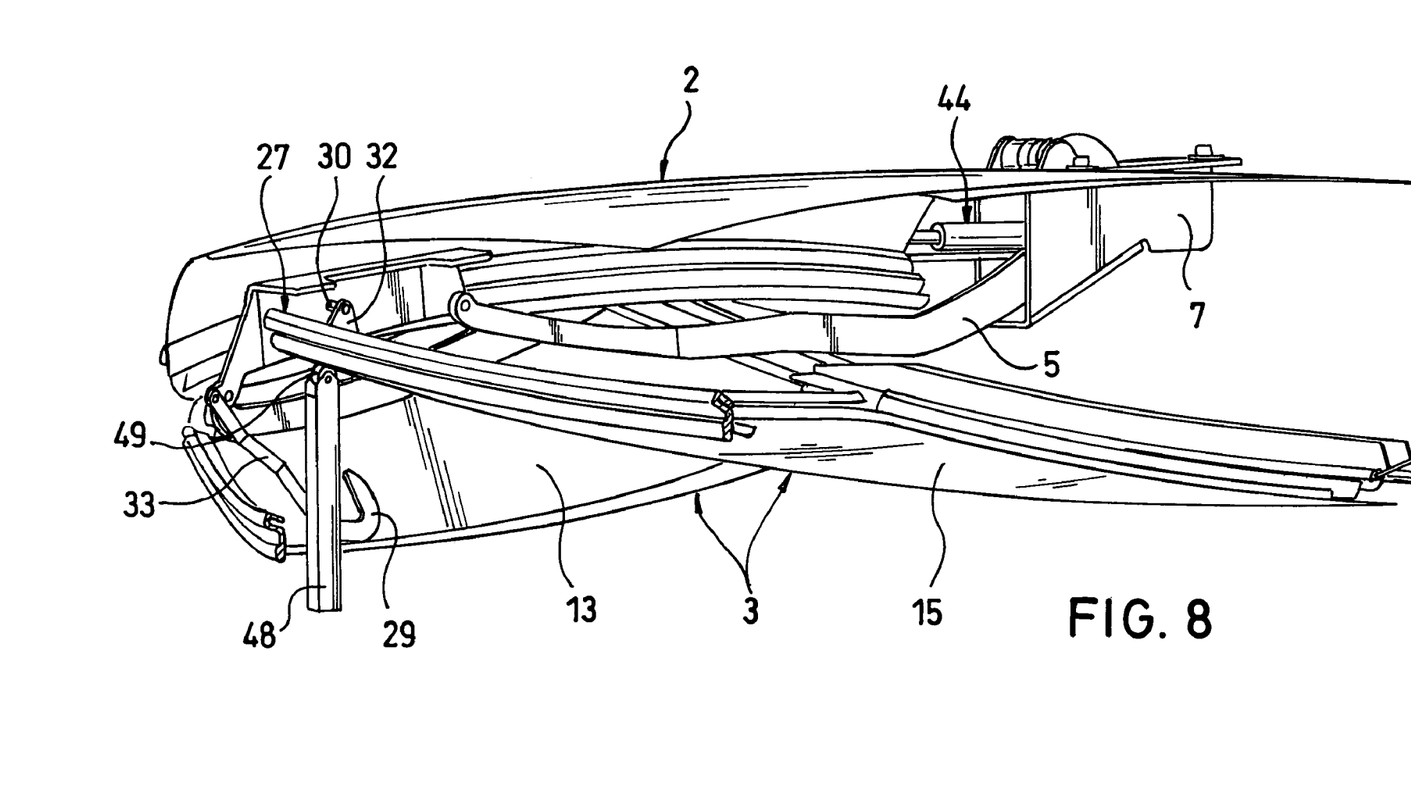
FIG. 8 is a view corresponding to that of FIG. 6, but with the motor vehicle roof lowered into its end position within the stowage space, the rear window being swung up to the maximum degree relative to the C pillars.

A hardtop roof 1 of a motor vehicle contains a front roof part 2 and a rear roof part 3 which can be moved between a closed position (FIG. 1) over the vehicle interior and an open position (FIG. 8) in which they are stowed in a rear stowage space or convertible top compartment. Such a roof is known fundamentally from German Patent DE 199 36 252 C2. The roof 1 is built essentially symmetrically to the lengthwise axis of the vehicle with bearing and driving means which are the same on either side, so that the roof 1 is described using only the bearing and driving means of the left side.

The roof 1 is movably supported on the body by a bearing means 4 in the form of a four-bar mechanism which has a front connecting rod 5 and a rear connecting rod 6 which are pivotally mounted, on the one hand, on the body-mounted main bearing 7 on the pivot pins 8, 9, and on the other hand, are pivotally coupled to a carrier or a bracket 10 on the pivot pins 11, 12. The especially hard-shell front roof part 2 is attached to the bracket 10.

The rear roof part 3 laterally contains a C pillar 13 which is attached to the rear connecting rod 6. The two opposing C pillars 13 are directly connected to one another only on their lower edge by means of a transverse part 14, for example, a roughly U-shaped frame which can also be attached to the respective rear connecting rod 6. In the opening between the two C pillars 13, there is a rear window 15 which on its lower or rear edge 16 is supported to be able to pivot around a pivot axis 17 on the transverse part 14 and relative to the two C pillars 13. The rear window 15 contains an edge-side window frame 18 (see cross-sectional view of FIG. 3) which is attached by means of cement 19 to the inside of the rear window 15 and has an outer flange 20 to which a window seal 21 is attached. With the roof 1 closed, the window seal 21 is pressed against the bottom of the seal flange 22 which projects from the C pillar 13 laterally against the rear window 15. The window seal 21 is made U-shaped, for example, with two legs 23, 24, so that at least the outer leg 24 adjoins the seal flange 22 and a channel 25 which is located between the two legs 23, 24 is used to drain water. A lining 26 covers the window frame 18 and the window seal 21 on the bottom.

Figure 3:
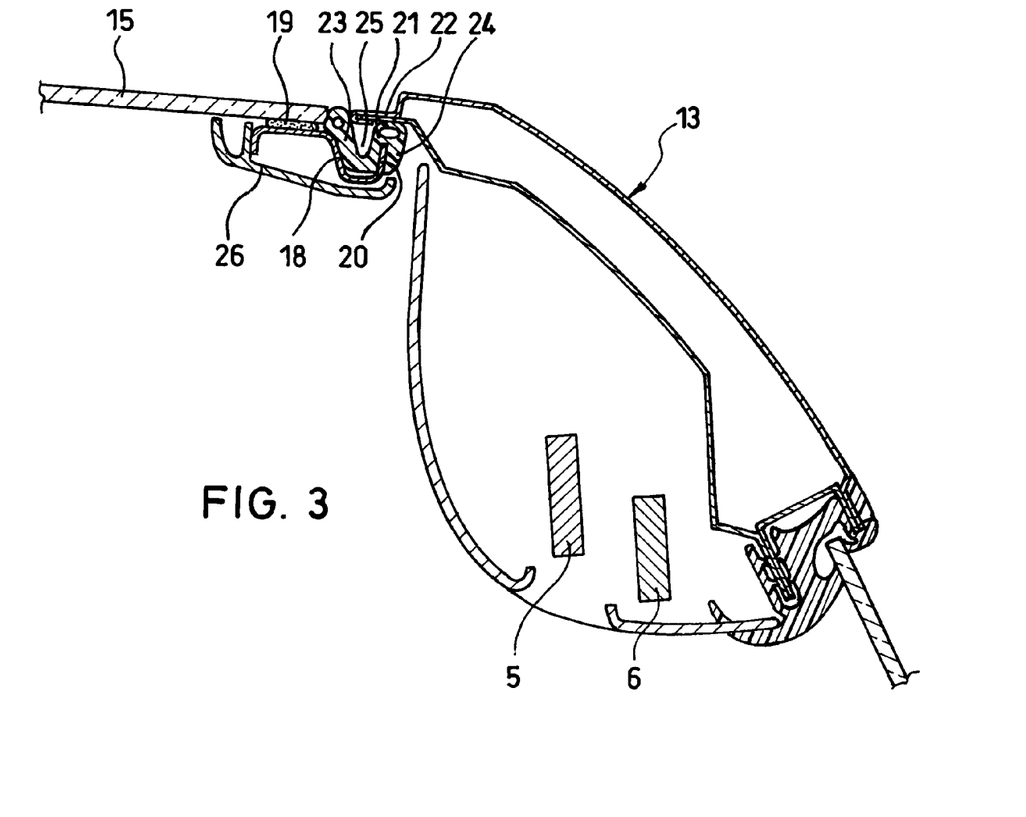
FIG. 3 is a cross-sectional view of the rear window of the rear roof part and its C pillar in the closed position of the roof.

Based on this arrangement of the window seal 21 and of the seal flange 22, the rear window 15 can thus be swung out of its closed position with its top edge 27 inwardly between the C pillars 13, but not outwardly.

Figure 7:
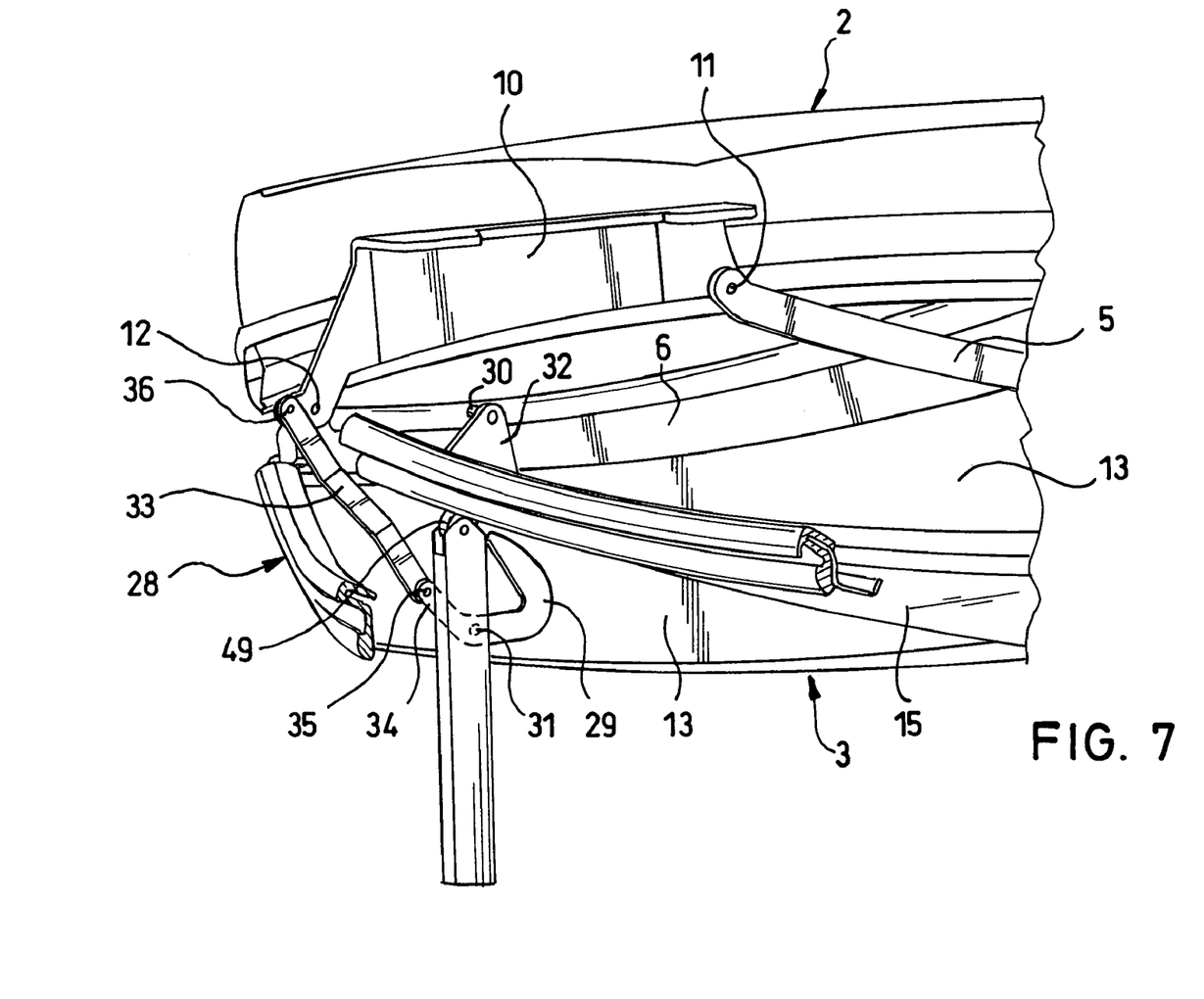
FIG. 7 is a view corresponding to that of FIG. 6, but with the motor vehicle roof lowered into the stowage space, and with the C pillars of the rear roof part lowered, and conversely, the rear window swung up relative to the C pillars.

On each C pillar 13, in the area of its top end 28 and adjacent to the rear window 15, there is a locking hook 29 for engaging the locking pin 30 of the rear window 15. The locking hook 29 is supported to be able to pivot around a pivot bearing 31 (see FIG. 7) and is arranged such that its hook opening is pointed essentially toward the top end 28 of the C pillar 13. The locking hook 29 can be moved into locking engagement on the locking pin 30 by pivoting around the latter, so that the rear window 15 is kept locked in its position on the C pillars 13. The locking pin 30, in the assignment to the locking hook 29, is mounted on the locking clip 32 which is located on the top side edge of the rear window 15.

A control connecting rod 33 is coupled, on the one hand, to the coupling end 34 of the locking hook 29, which end projects beyond the pivot bearing 31, in a joint 35, and on the other hand, relative to the bracket 10 in a joint 36 which is spaced away from the pivot pin 12.

Figure 2:
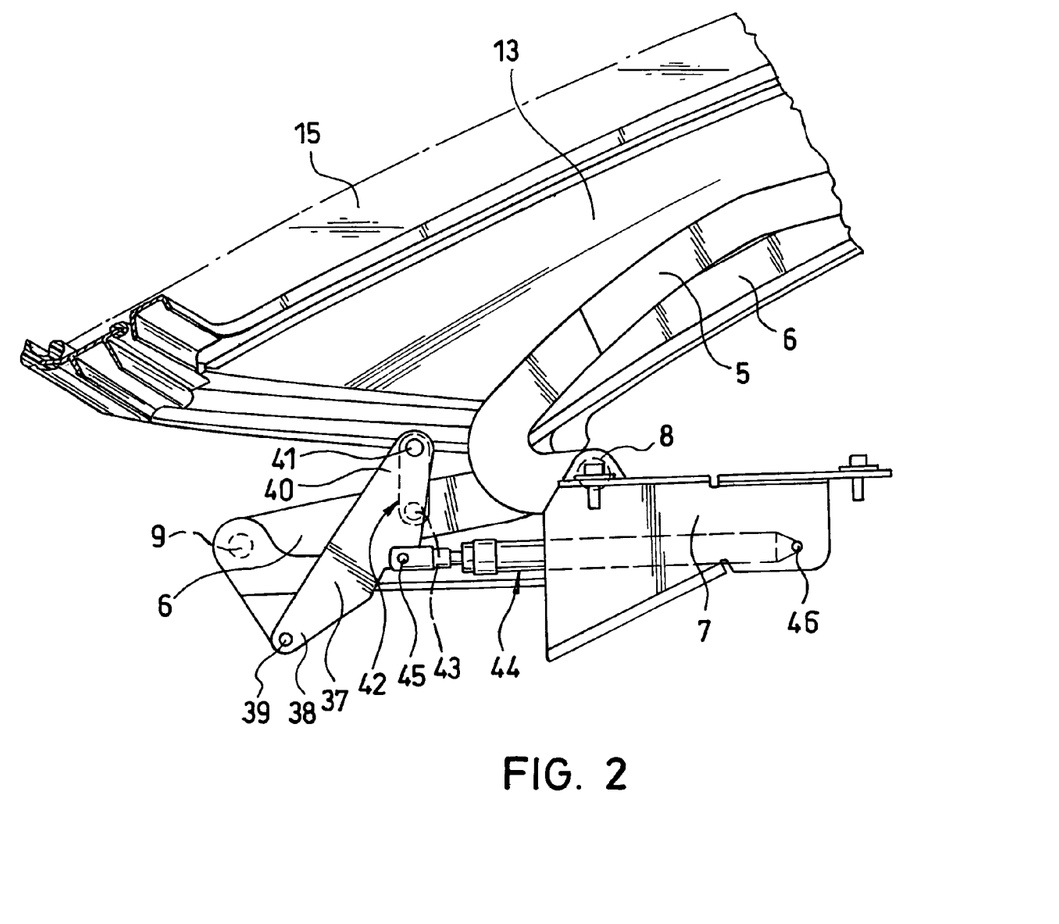
FIG. 2 is an enlarged partial representation of the main support of the motor vehicle roof on the body shown in FIG. 1.

A swinging means for swinging the roof 1 contains a rocker 37 (see especially FIG. 2) which is supported with its bottom end 38 on the main bearing 7 to be able to pivot around a pivot axis 39 and is connected by its top end 40 to be able to pivot on a hinge pin 41 relative to a coupler 42 which, in turn, is hinged to the rear connecting rod 6 by a pivot pin 43 which is spaced away from the lower pivot pin 9 of the rear connecting rod 6. A drive, for example, a hydraulic piston-cylinder unit 44, is hinged to the rocker 37 and also to the main bearing 7 (joints 45, 46).

With the roof 1 closed, the rocker 37 and the coupler 42 are at an acute angle relative to one another so that the last closing motion of the drive 44 on the rocker 37 causes only a slight swinging of the rear connecting rod 6 by the coupler 42 in the closing direction, but a high closing force is transmitted to the rear connecting rod 6. Furthermore, the locking hook 29, which is swung via the control connecting rod 33 engaged to the locking pin 30, keeps the rear window 15 pressed securely into its closed position against the seal flange 22 on the C pillars 13.

Figure 4:
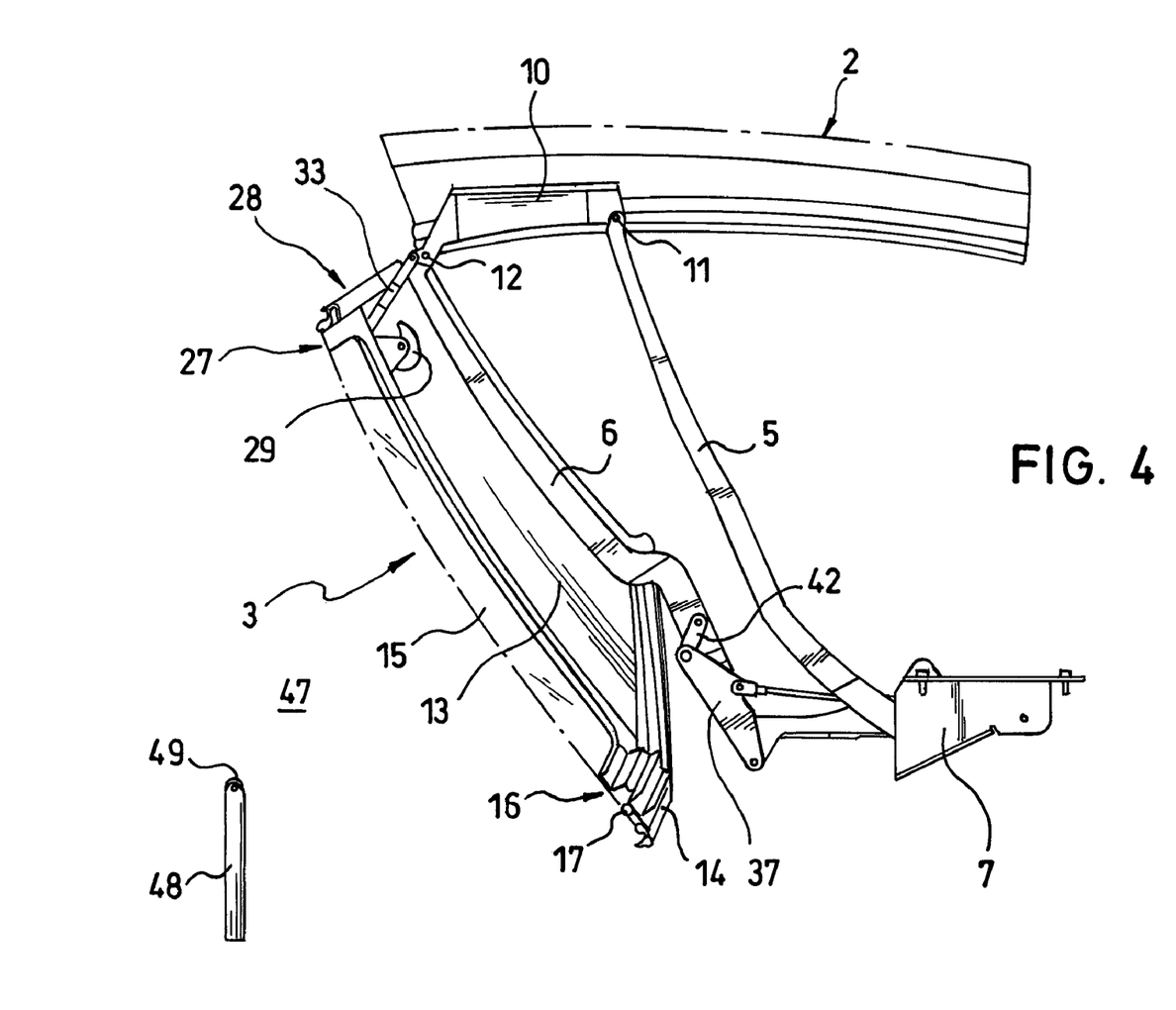
FIG. 4 is a lengthwise sectional view of the motor vehicle roof in an intermediate position as it is being stowed in a stowage space.

To open the roof 1, the drive 44 is actuated so that its piston rod extends and swings the rear connecting rod 6 via the rocker 37 and the coupler 42. In doing so, the entire four-bar mechanism (front connecting rod 5, rear connecting rod 6, bracket 10), and thus, the rear roof part 3 as well as the front roof part 2, are moved in the direction toward the stowage position (see FIG. 4). The control connecting rod 33 continues to hold the locking hook 29 in its latch position engaged to the locking pin 30 of the rear window 15.

As the rear connecting rod 6 continues to pivot, the two roof parts 2, 3 approach their stowed position in the stowage space 47 (see FIG. 5) of the vehicle, the rear roof part 3 with its bottom facing up against the front roof part 2 which has been swung over it. The control connecting rod 33 now swings the locking hook 29 into its open position in which it releases the locking pin 30. Thus, the rear window 15 is no longer held locked on the C pillars 13. The rear window 15, due to its weight, furthermore, adjoins the seal flange 22 of the C pillars 13.

Figure 5:
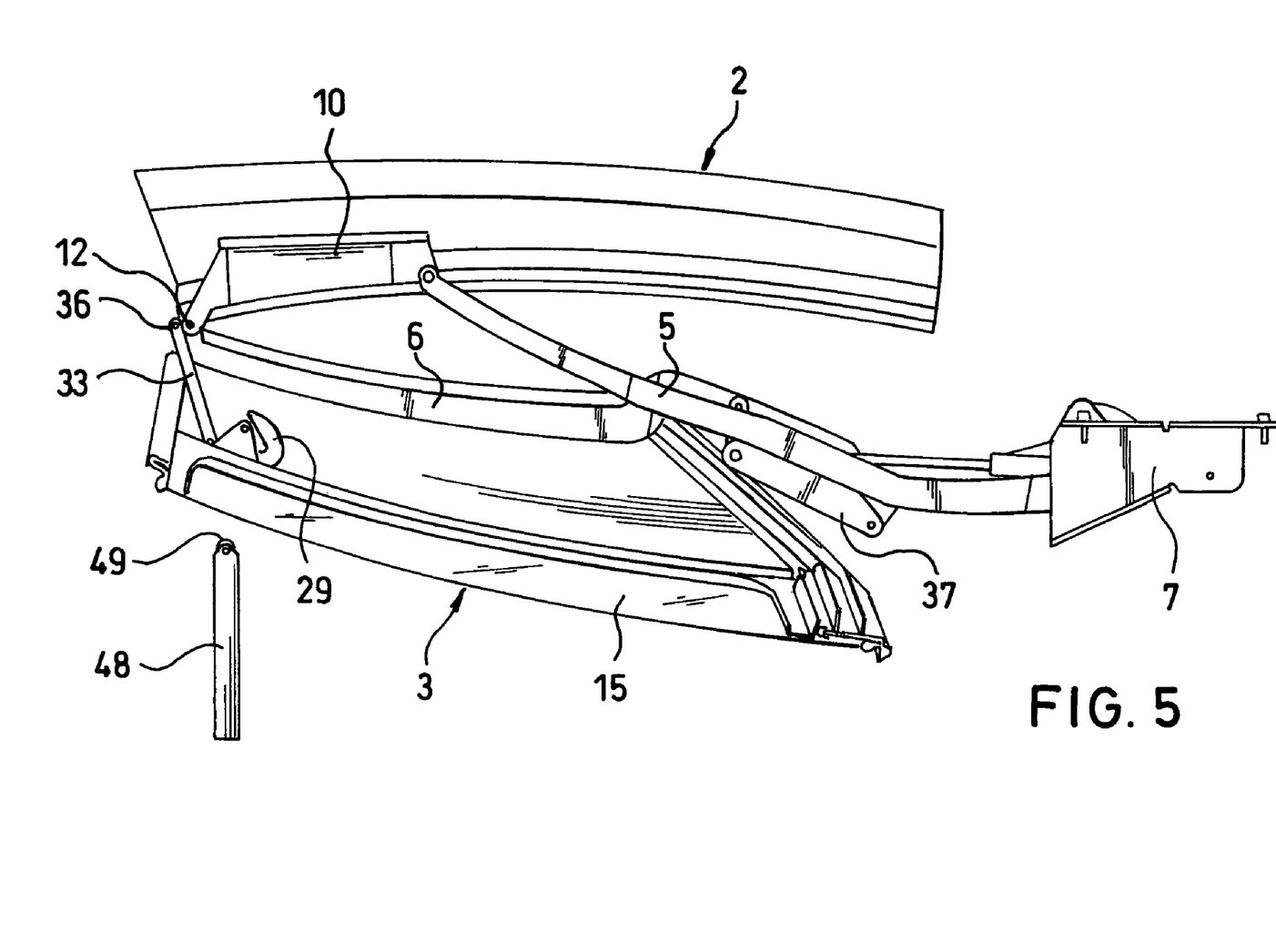
FIG. 5 is a view corresponding to that shown in FIG. 4, but showing the motor vehicle roof lowered farther.
Figure 6:
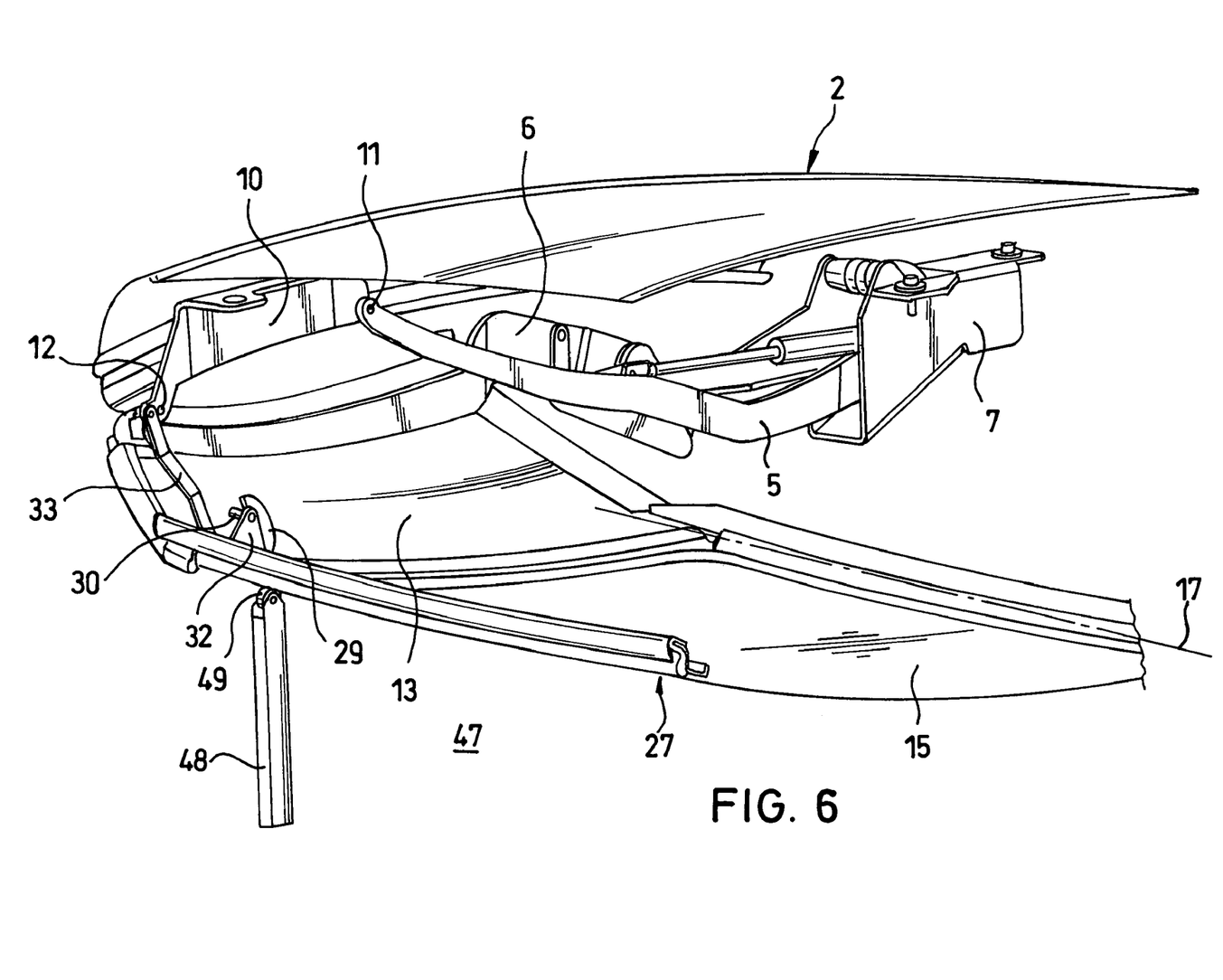
FIG. 6 is a side overhead perspective view of the motor vehicle roof in the intermediate position in the stowage space in which the rear window rests on a support.

As the roof 1 continues to be lowered out of the position shown in FIG. 5, the rear window 15 meets the support which is located laterally on the stowage space 47, preferably a roller 49 which is supported on a holding device 48 and which supports the rear window 15, especially on its side edge near the top edge 27 (FIG. 6).

If, at this point, when the roof 1 is being stowed, the rear roof part 3 is swung farther down (see FIG. 7), the rear window 15 remains resting on the roller 49 and pivots around its pivot pin 17 relative to the two C pillars 13 which move farther down with the rear roof part 3. This relative movement is now possible since the rear window 15 and its locking pin 30 are no longer held by the locking hook 29 on the C pillars 13.

In the stowed end position of the roof 1 (see FIG. 8), the rear window 15, in the area of its top edge 27, rests on the support or supports or the rollers 49 and is swung up to the maximum degree around its pivot pin 17, opposite the lateral C pillars 13. The position of the roller 49 in the stowage space 47 is selected such that the top edge 27 of the rear window 15 adjoins the bottom of the stowed front roof part 2 as closely as possible so that an additional usable trunk or stowage space is made available underneath the rear window 15.

Since the pivot pin 9 of the rear connecting rod 6, and thus, of the rear roof part 3 and the pivot pin 17 of the rear window 15 are spaced apart from one another opposite the C pillars 13, the rear window 15 executes relative motion which is directed forward with respect to the vehicle, opposite the support 49, so that it is advantageously formed as a roller 49, for example, as a plastic or rubber roller.

The swinging of the rear window 15 into the stowage position which is higher opposite the lateral C pillars 13 takes place, thus, without an active driving means for the rear window 15 so that the described relative swinging of the rear window 15 can be called passive movement.

To close the stowed roof 1, the driving means 44 swings the rear connecting rod 6 up, the C pillars 13 being raised and in their upward motion with their seal flange 22 entraining the rear window 15 which rests on the support 49. The opened locking hook 29 is guided past the locking pin 30 and as the C pillars 13 are raised further, is swung by means of the control rod connecting rod 33 into its latch position on the locking pin 30. Thus, the rear window 15 is again in its correct closed position on the C pillars 13 and on the rear roof part 3. The latch means must be designed such that the locking hook 29 always holds the locking pin 30 securely so that the motor vehicle roof can also be reliably opened and closed when the vehicle is on a very highly inclined surface, such as, for example, the approach to an underground garage.

Figure 1:
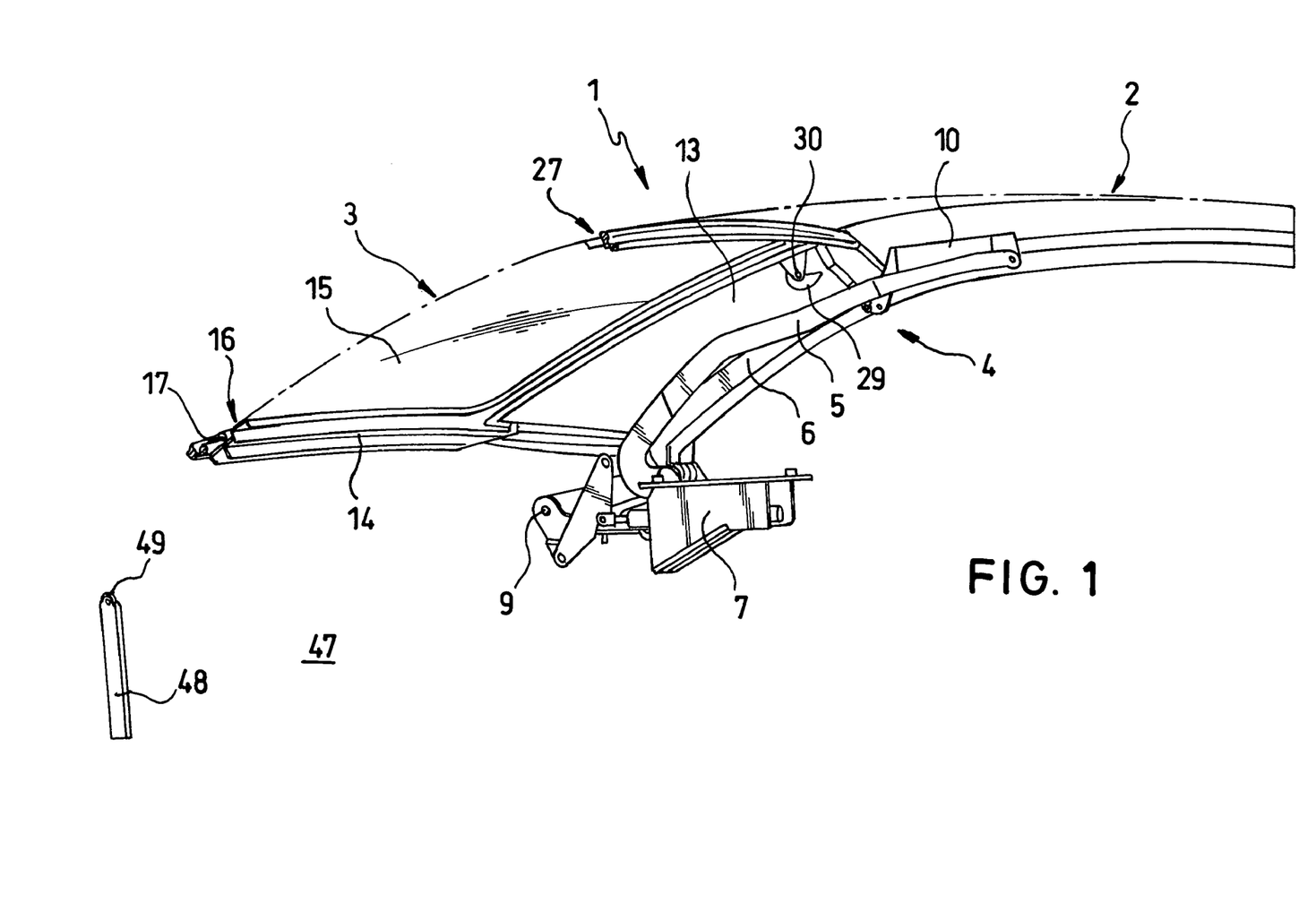
FIG. 1 is a partial lengthwise sectional view showing the left half of the motor vehicle roof in the closed position over the vehicle interior.

Finally, the driving means 44 swings the roof 1 into the closed position which is shown in FIG. 1 and in which the front roof part 2 is kept locked on the apron. This locking, however, is not the subject matter of this application and therefore is not further described here.

Figure 9:
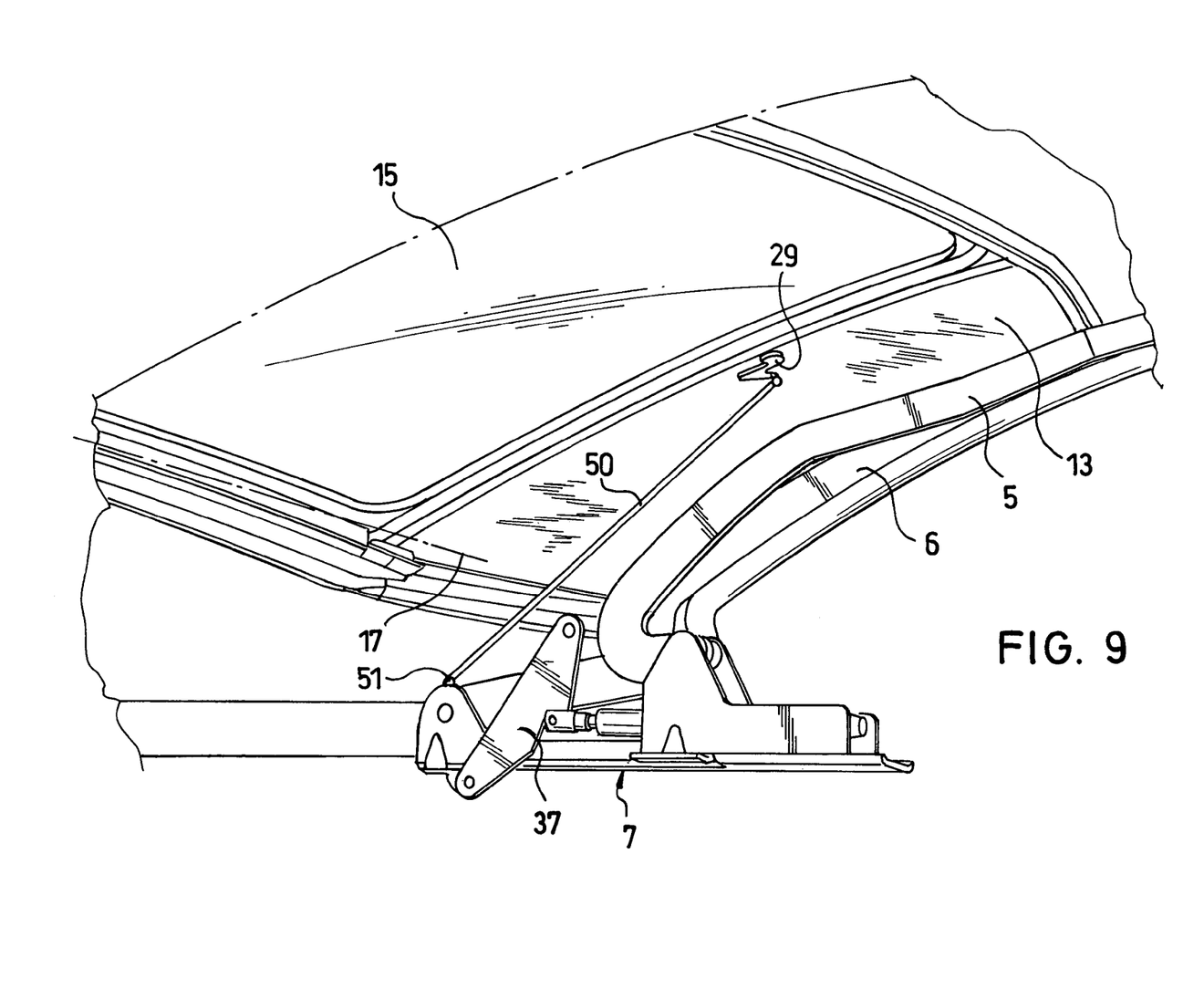
FIG. 9 shows a side view another embodiment for coupling of a latch means which locks the rear window to the C columns.

The embodiment shown in FIG. 9 contains a control rod 50 for actuating the locking hook 29; the rod connects the locking hook 29 to a coupling point 51 on the main bearing 7. The coupling point 51 is preferably located in the vicinity of the pivot pin 9 of the rear connecting rod 6 in a position such that the locking hook 29 executes the above described latching motion at the desired time when the rear roof part 3 is swinging. The locking hook 29, here, is supported to be able to pivot, for example, around a pivot axis which runs essentially perpendicular to the rear window 15. Conversely, the locking hook 29 can be pivoted, for example, around a pivot axis which runs roughly parallel to the rear window 15 in the first embodiment. The pivot axis and the swinging plane of the locking hook 29 can, however, be chosen according to the requirements or the actuating means. The locking hook 29 which is shown in FIG. 9, in interaction with the locking pin of the rear window 15, can be made such that it can likewise execute a tensioning motion in the closing direction of the rear window 15 against the C pillars 13. This is achieved, for example, via tensioning bevels on the locking hook 29 or on the locking pin.

What is claimed is:

1. Vehicle roof of a convertible, comprising:
at least one front roof part, a rear roof part, at least the rear roof part being movable between a closed position over the vehicle interior and an open position in which the rear roof part is stowed in a rear stowage space,
a rear window which is supported on the rear roof part, and which is pivotable relative to the rear roof part, and in the open position in which the rear roof part is stowed in the stowage space, the rear wind assuming a position which is raised relative to the rear roof parts,
a holding means which, with the roof in the closed position keeps the rear window in its closed position on the rear roof part and when the rear roof part is being stowed releases the rear window to pivot relative to the rear roof part, and
a support which is mounted in the stowage space and which supports the rear window in a manner enabling pivoting of the window while the rear roof part is lowered into the stowage space and pivots in relative terms opposite the rear window.

2. Motor vehicle roof as claimed in claim 1, wherein the rear roof part has lateral C pillars, and wherein the rear window is supported to pivot around a pivot axis its rear edge.

3. Motor vehicle roof as claimed in claim 1, wherein a generally horizontally oriented surface of the rear roof part faces downward toward an upwardly facing, generally horizontally oriented surface of the rear window in the open position of the rear roof part, wherein the rear window, in its closed position, adjoins the bottom of a flange of the rear roof part, and wherein the rear roof part is swung during stowage so that an outer side of the rear window faces downward in the stowage space.

4. Motor vehicle roof as claimed in claim 1, wherein the holding means has at least one locking hook which is pivotally mounted on the rear roof part, and which interacts with an opposing latch part which is connected to the rear window.

5. Motor vehicle roof as claimed in claim 1, wherein the holding means is coupled to a bearing means of the roof and is controlled by its swinging motion.

6. Motor vehicle roof as claimed in claim 4, wherein the locking hook is coupled by a control connecting rod to a four-bar mechanism which supports the roof.

7. Motor vehicle roof as claimed in claim 4, wherein the locking hook is coupled by a control connecting rod to a bracket which connects a front and a rear connecting rod and is actuated by the bracket.

8. Motor vehicle roof as claimed in claim 4, wherein the locking hook is connected by a control rod to a vehicle-mounted part.

9. Motor vehicle roof as claimed in claim 8, wherein the vehicle-mounted part is a main bearing of a bearing means of the roof.

10. Motor vehicle roof as claimed in claim 1, wherein the rear window is adapted to execute a relative motion opposite the support as the roof is being stowed.

11. Vehicle roof of a convertible, comprising:
at least one front roof part, a rear roof part, at least the rear roof part being movable between a closed position over the vehicle interior and an open position in which the rear roof part is stowed in a rear stowage space,
a rear window which is supported on the rear roof part, and which is pivotable relative to the rear roof part, and in the open position in which the rear roof part is stowed in the stowage space, the rear window assuming a position which is raised relative to the rear roof part.

a holding means which, with the roof in the closed position keeps the rear window in its closed position on the rear roof part and when the rear roof part is being stowed releases the rear window to pivot relative to the rear roof part, and a support which is located in the stowage space and which supports the rear window in a manner enabling pivoting of the rear window while the rear roof part is lowered into the stowage space and pivots in relative terms opposite the rear window;

wherein the support comprises at least one roller on which the rear window rests.

12. Motor vehicle roof as claimed in claim 1, wherein a respective support supports the rear window at each of opposing side edges thereof.

* * * * *